United States Patent [19]
Gable et al.
[11] Patent Number: 4,481,641
[45] Date of Patent: Nov. 6, 1984

[54] COAXIAL CABLE TAP COUPLER FOR A DATA TRANSCEIVER

[75] Inventors: Melvin G. Gable, Ypsilanti, Mich.; Richard H. Sherman, Fremont, Calif.

[73] Assignee: Ford Motor Company, Dearborn, Mich.

[21] Appl. No.: 429,418

[22] Filed: Sep. 30, 1982

[51] Int. Cl.[3] .......................... H04B 1/48; H01P 5/12

[52] U.S. Cl. .......................................... 375/7; 375/36; 333/128; 333/136; 339/177 R; 339/17 C; 455/78

[58] Field of Search ............... 333/128, 127, 124, 136; 375/36, 7; 455/80, 78.5; 361/399, 397, 408; 339/17 C, 17 LM, 177 R; 358/86

[56] References Cited

U.S. PATENT DOCUMENTS

| | | | |
|---|---|---|---|
| 2,511,524 | 6/1950 | Adler | 178/44 |
| 3,585,399 | 6/1971 | Andrews, Jr. | 307/208 |
| 3,842,189 | 10/1974 | Southgate | 339/17 C X |
| 3,870,978 | 3/1975 | Dreyer | 333/97 R |
| 3,881,160 | 4/1975 | Ross | 333/127 X |
| 3,895,318 | 7/1975 | Ross | 333/136 |
| 4,024,479 | 5/1977 | de Vries | 333/8 |
| 4,045,750 | 8/1977 | Marshall | 333/6 |
| 4,086,534 | 4/1978 | Olson | 325/15 |
| 4,270,214 | 5/1981 | Davis et al. | 455/80 |

*Primary Examiner*—Paul L. Gensler
*Assistant Examiner*—Benny Lee
*Attorney, Agent, or Firm*—Paul K. Godwin, Jr.; Robert D. Sanborn

[57] ABSTRACT

A coaxial cable coupler that provides a low impedance through conductor for a passive coaxial transmission cable and a high impedance tap to periodic transmission means and receiver means. The tap connection is a removable connection that is formed by a resilient electrical conductor compressed between exposed portions of the main transmission through conductor and an exposed tap conductor interconnecting the high impedance networks of the transmission means and the receiver means.

7 Claims, 4 Drawing Figures

COAXIAL CABLE TAP COUPLER FOR A DATA TRANSCEIVER

BACKGROUND OF THE INVENTION

1. Field of the Invention

The present invention is directed to the field of transmission lines and more specifically to the area of tap connectors for interconnecting data transmission and receiving equipment to a main transmission line.

2. Description of the Prior Art

Prior Art transmission cable couplers have been developed that are intended to allow tap connections of individual transmitting/receiving stations along a main coaxial transmission cable. Such couplers often provide for passive transmitter isolation and fixed connections that may adversely affect the entire system whenever coupler components become defective and until the coupler is removed and replaced.

SUMMARY OF THE INVENTION

As an improvement over the prior art devices, the present invention is intended to provide a coaxial cable coupler that continuously maintains the low impedance and integrity of a main transmission cable, while providing for a readily removable high impedance tap connection. A unique compressible electrical connector is employed to provide the electrical communication between the tap connection and the main transmission cable whenever the tap connection is in place. In this manner, whenever a local transmitter/receiver station fails or a tap connection module fails, the tap connection can be removed from the coupler without degrading the signal transmissions on the main transmission cable.

In addition, active components are placed on the tap connector circuit board to provide for impedance switching from a high impedance to a low impedance tap connection only when the transmission signals are present at the coupler from an associated transmitter. The inclusion of active switching components within the coupler provides for highly efficient coupling of the transmitted signal to the main transmission cable through the tap connection.

DETAILED DESCRIPTION OF THE PREFERRED EMBODIMENT

Figure 1:
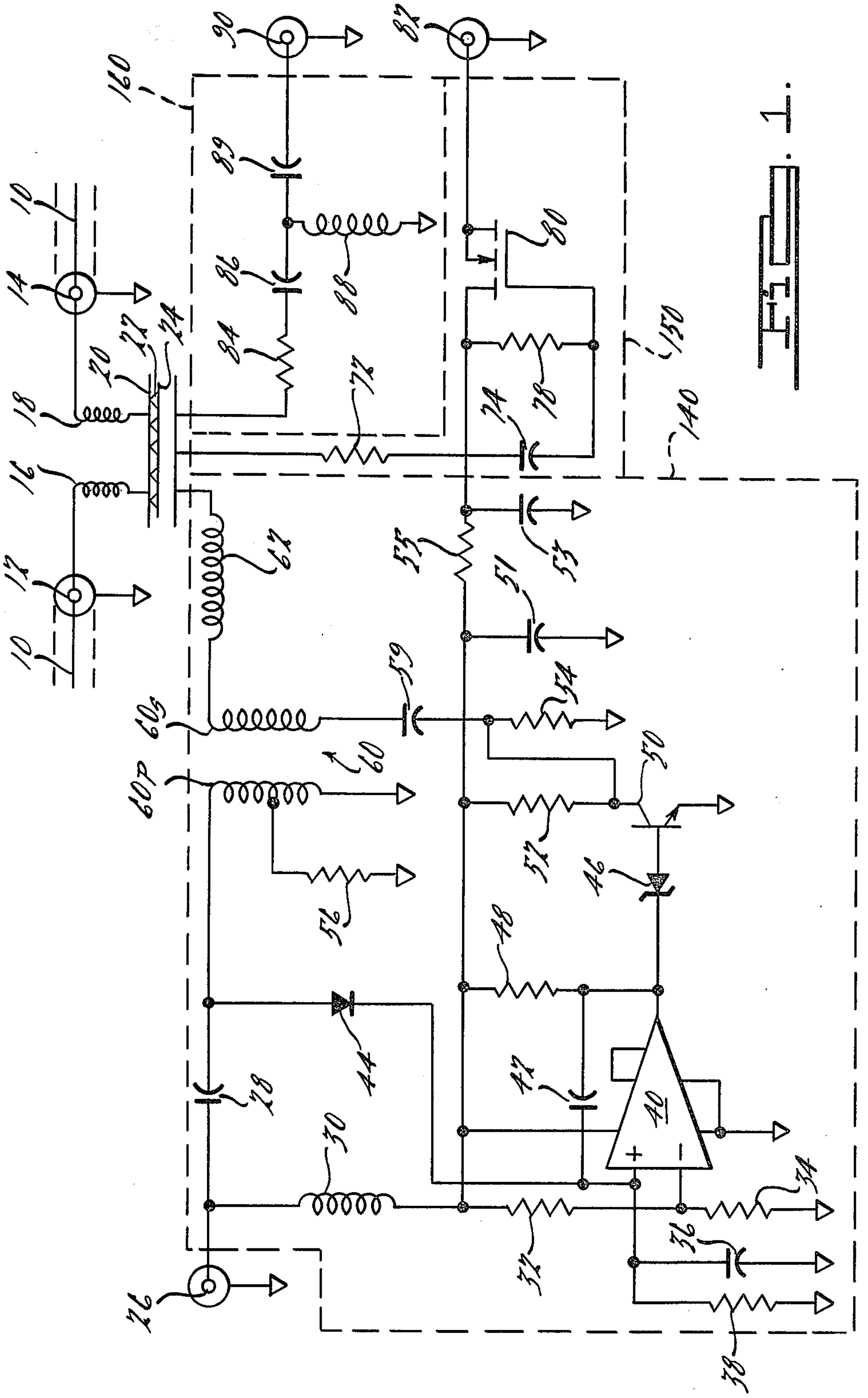
FIG. 1 is an electrical schematic of the present invention.

The coaxial cable coupler of the present invention is schematically illustrated in FIG. 1. The main coaxial transmission cable 10 is shown as having end connectors 12 and 14 connected to the shielding housing 100 that contains the present invention. The coaxial cable in this instance is a 75 ohm passive transmission line that provides simultaneous transmission for RF (VHF) TV signals and digital data. A low-pass T filter network is formed in series with the signal carrying conductor of the transmission cable 10 to provide a 75 ohm impedance over the entire frequency range. The T filter network comprises inductive coils 16 and 18 respectively connected between the signal carrying conductor of the coaxial connectors 12 and 14, and opposite ends of a conductor strip 20 permanently mounted within the housing 100. The conductor strip 20 is physically embodied (FIG. 4) as a pair of exposed strip conductors 20A and 20B on opposite sides of a substrate 101. The T network coils 16 and 18 and strip conductor 28 provide a permanent interconnection for the ends of the transmission cable 10 and form a continuously low impedance transmission path that allows intercommunication between other stations along the cable 10.

The invention provides a high impedance tap which is removably connected to the strip conductor 20 via a resilient electrical conductor 22. The resilient electrical conductor 22, when connected, is compressed so as to provide positive electrical contact with the exposed surface of strip conductor 20B. In the present embodiment, the resilient conductor 22 is formed from a piece of berylium/copper RF gasket material mounted on an exposed tap strip conductor 24 formed on a printed circuit board substrate (see FIG. 4). The tap strip conductor 24 provides interconnection of the output from a data transmission switch 140; the input to a data receiver buffer circuit 150; and the input to an RF video band filter circuit 160. (We perceive that the resilient conductor 22 could be mounted on the strip conductor 20B as an alternative embodiment.)

The data transmission switch 140 has an input connector 26 normally connected to the transmitter portion of an associated station modem (not shown). The associated modem transmitter periodically outputs data to be transmitted through data transmission switch 140 and coupled to the main transmission cable 10. A DC voltage is also provided from the associated modem transmitter on the signal carrying conductor of connector 26 to power the circuitry in the data transmission switch 140 and the data receiver buffer circuit 150.

A capacitor 28 functions to block the DC voltage supplied through the coaxial connector 26 and to provide coupling for polar base band data signals output from the modem transmitter to a primary winding $\mathbf{60}_p$ of a coupling transformer 60. Similarly, an inductor 30 blocks the RF data signals from the transmitter on coaxial connector 26 while allowing the DC voltage to be applied to a filter and voltage divider network comprising resistors 32, 34 and 55 and capacitors 51 and 53.

In the absence of polar base band data signal output from the modem transmitter to the data transmission switch 140, the filtered DC voltage developed across the divider network comprising resistors 32 and 34 results in a positive voltage being applied to the inverted (−) input of a comparator circuit 40. In this instance, no voltage is present on the non-inverting (+) input terminal of the comparator 40, resulting in the output voltage of the comparator 40 being in a low state that maintains a transistor 50 in an off condition. With transistor 50 being held in a non-conducting state, the secondary winding $\mathbf{60}_s$ of the transformer 60 reflects a high impedance to the main transmission line 10. As a result, signal losses for transmissions by other stations connected to the main transmission line 10 are very low.

During local station modem data transmissions from the modem connected to coaxial connector 26, positive excursions of the polar base band signal are passed by capacitor 28 and are rectified by diode 44. A charge accumulates on capacitor 36 to a positive voltage value which is also applied to the non-inverting input terminal of comparator 40. when the voltage exceeds the positive voltage present at the inverting input terminal the output of the comparator 40 switches to a high level. When the output voltage level of the comparator 40 switches to a high level and exceeds approximately +6.3 VDC, established by the value rating of zener diode 46 and the base-emitter junction of transistor 50, the transistor 50 is biased into a saturated condition. The junction of resistor 54 and capacitor 59 is effectively shorted to ground through transistor 50. Consequently, the secondary winding $60_s$ of the transformer 60 is AC grounded through the capacitor 59 providing for maximum transfer of power for the data signals applied to the primary winding $60_p$ of the transformer 60.

The data signals coupled through to the secondary winding $60_s$ of the coupling transformer 60 are applied through an inductor 62 which provides a low-pass filter to the main transmission cable 10 via the resilient electrical conductor 22. This low-pass filter provides a high impedance coupling to the main transmission cable 10 thus reducing standing waves or return loss at RF(VHF) frequencies. The data signal is also applied, via the tap strip conductor 24 to the input circuit of the data receiver buffer circuit 150 for routing back to the associated modem receiver connected to coaxial connector 82.

The data receiver buffer circuit 150 reflects a high input impedance to the transmission line 10, in order to provide for a minimum of insertion loss (less than 0.1 db), while terminating into a 75 ohm input impedance of the modem receiver at coaxial connector 82. The data receiver buffer circuit 150 includes a MOS power FET 80 that is connected as a voltage follower. Input signals from other stations in the system are received from the main transmission line 10 across the resilient electrical connector 22, through a resistor 72 and capacitor 74, and applied to the gate of FET 80. The output of FET 80 is applied to the associated modem receiver via the coaxial cable connector 82.

Since RF television video signals may be simultaneously transmitted by the main transmission cable along with the polar base band digital data without compromising the integrity of the digital data channel, a video band pass filter 160 is configured to pass the RF (VHF) video signals and output those signals to a coaxial connector 90, which is connected to a television type monitor. One end of a resistor 84 is connected to the tap strip conductor 24 and its other end is connected to a high pass filter comprising series capacitors 86 and 89 with an inductor 88 connected between their junction and ground. The filter is connected to the coaxial connector 90 to pass any received video signals to the associated monitor.

Figure 3:
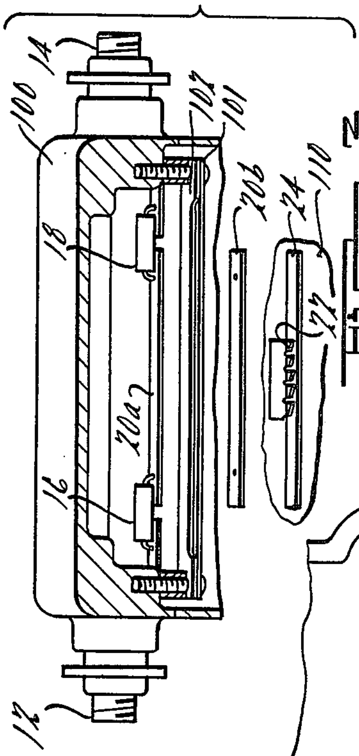
FIG. 3 is an exploded cross-sectional view of the tap connection of the present invention.
Figure 4:
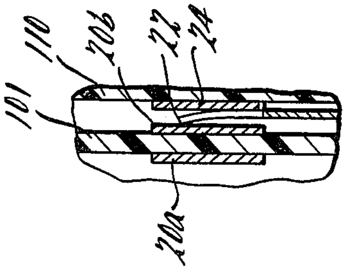
FIG. 4 is a partial cross-sectional view illustrating the compressed resilient connector and tap connection of the present invention.
Figure 2:
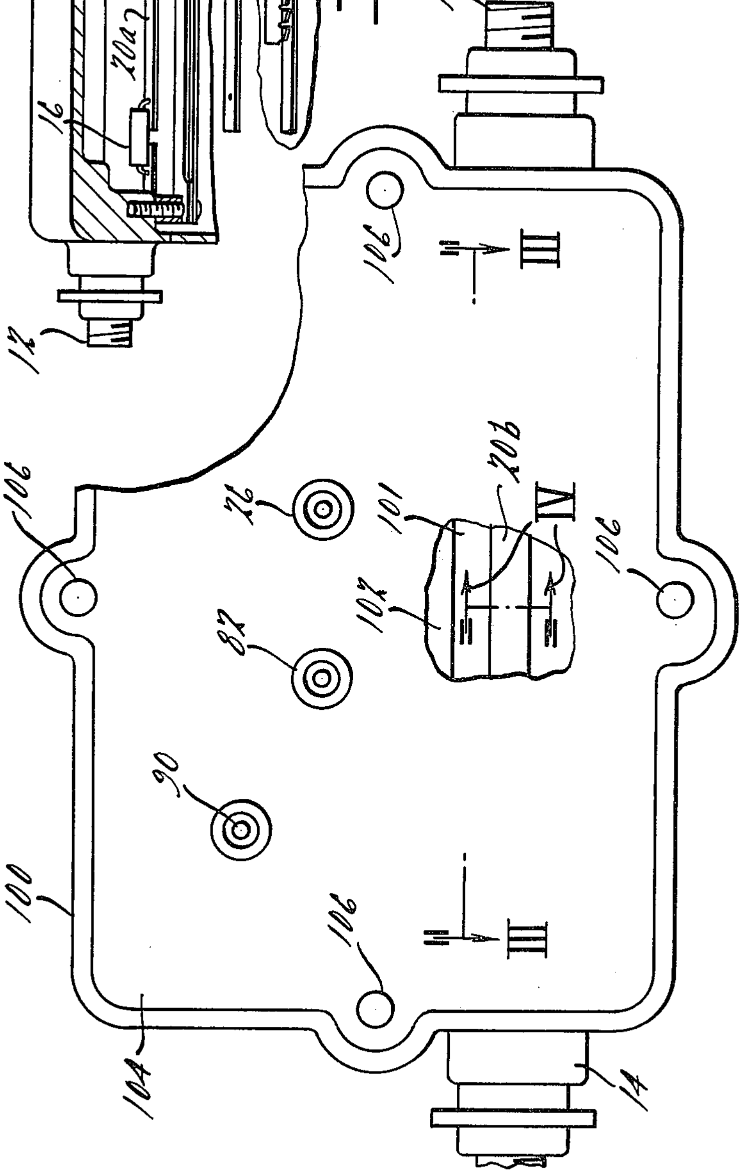
FIG. 2 is a plan view of the external housing of the present invention showing a partial cross-section.

The physical embodiment of the present invention is shown in FIGS. 2, 3 and 4 wherein a shielding metal housing 100 provides a permanent connection and low impedance through-path for the main transmission line 10 connected to the coaxial connectors 12 and 14. A removable panel 104 may be connected to the housing 100 via four screws 106 as shown in FIG. 2. The removable panel 104 contains the circuits shown in FIG. 1 that are electrically connected between the resilient electrical connector 22 and the coaxial connectors 26, 82 and 90. In this manner, the station circuitry can be removed from the housing 100 by removing the plate 104 without disturbing or affecting the continuous interconnection of the system communications provided by the main transmission cable 10.

FIG. 3 illustrates a partial cross-section of the housing 100 and an exploded view of the removable tap connection. As in the schematic diagram, the center signal carrying conductor of the coaxial connectors 12 and 14 are electrically connected to an exposed strip conductor 20 via inductors 16 and 18. In FIG. 3, the strip conductor 20 is shown as comprising a pair of exposed strip conductors 20A and 20B formed on opposite sides of a substrate material 101. The leads of the inductors 16 and 18 are soldered through apertures in the substrate 101 to electrically interconnect the strip conductors $20_A$ and $20_B$. The lower strip conductor $20_B$ is oriented to be contacted by the resilient electrical conducting material 22, which in this instance is affixed to overlay the exposed tap strip conductor 24 mounted on a printed circuit board substrate 110. It is forseen that one could alternatively configure the embodiment to affix the resilient electrical conducting material 22 to overlay the surface of lower strip conductor $20_B$. When the plate 104 is mounted in place within the housing 100, the resilient conductor material 22 is compressed between the then opposing surfaces of the strip conductors 24 and $20_B$ to thereby make a positive connection therebetween (see FIG. 4). In FIG. 3, a grounded strip conductor 102 is also shown as interconnected between mounting screws on the substrate 101.

It can be seen from the foregoing, that the present invention provides for the maintenance of a low impedance transmission line path and at the same time provides for a minimal insertion loss tap that reflects a high impedance to the transmission line when the local station is not transmitting. The use of the resilient material to provide the interconnection between the local station tap and the main transmission cable, provides for a rapid disconnect when servicing is required, as well as a positive, reliable tap connection.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A coaxial cable coupler for maintaining a continuous low impedance path for a main coaxial transmission cable and for providing a removable tap connection to said cable comprising:

a housing for electrically shielding a portion of said main coaxial transmission cable and said tap connection;

first and second coaxial connectors on said housing for electrically connecting said housing to a shield conductor of said main coaxial transmission cable and for electrically insulating said housing with respect to a signal carrying center conductor of said main coaxial transmission cable;

means within said housing for providing a low impedance path between the signal carrying center conductor of said first and second coaxial connectors and including a substrate with a first exposed strip conductor electrically connected to said connectors;

means providing an exposed tap strip conductor for mounting within said housing in an opposing position with respect to said first strip conductor;

resilient electrically conducting means mounted between said first strip conductor and said tap strip conductor and being compressed therebetween to provide said tap connection when said tap strip conductor providing means is mounted in said housing; and said tap strip conductor providing means further includes circuit means for maintaining a high impedance receiving network and a switchable high impedance transmitting network connected to said tap strip conductor.

2. A coupler as in claim 1, wherein said resilient electrically conducting means is affixed to overlay the exposed surface of said first strip conductor.

3. A coupler as in claim 1, wherein said resilient electrically conducting means is affixed to overlay the exposed surface of said tap strip conductor.

4. A coupler as in claim 1, wherein said switchable high impedance transmitting network includes a transformer having a primary winding connected to receive periodically transmitted data signals from an associated transmitter via a transmitter output connector on said tap strip connector providing means, and a secondary winding electrically connected between said tap strip connector and a normally open electronic switch to reflect a high impedance to said main transmission cable when no data signals are being transmitted by said associated transmitter means.

5. A coupler as in claim 4, further including means for detecting the presence of said periodically transmitted data signals from said associated transmitter means and wherein said normally open electronic switch is activated by said detecting means to provide a relatively low impedance path to ground only when said periodic transmitted data signals are present thereby enabling said signals to be induced to said secondary winding and conducted through said resilient electrically conducting means, onto said main transmission cable.

6. A coupler as in claim 5, wherein said high impedance receiving network includes a voltage follower buffer circuit having its input connected to said tap strip conductor and its output connected to a receiver input connector on said tap strip conductor providing means.

7. A coupler as in claim 4, wherein said switchable high impedance transmitting network further includes a low-pass filter connected between said secondary winding of said transformer and said tap strip conductor to provide said high impedance coupling to said main transmission cable for RF(VHF) frequencies.

* * * * *